United States Patent
Piccionelli

(10) Patent No.: US 7,946,919 B2
(45) Date of Patent: May 24, 2011

(54) METHOD, SYSTEM AND APPARATUS FOR LOCATION-BASED GAMING

(76) Inventor: Gregory A. Piccionelli, Westlake Village, CA (US)

( * ) Notice: Subject to any disclaimer, the term of this patent is extended or adjusted under 35 U.S.C. 154(b) by 140 days.

(21) Appl. No.: 11/804,054

(22) Filed: May 15, 2007

(65) Prior Publication Data

US 2007/0225077 A1    Sep. 27, 2007

Related U.S. Application Data

(63) Continuation of application No. 10/461,171, filed on Jun. 13, 2003, now abandoned.

(60) Provisional application No. 60/389,700, filed on Jun. 14, 2002.

(51) Int. Cl.
*G06F 17/00* (2006.01)
*G06F 19/00* (2006.01)

(52) U.S. Cl. ............... 463/31; 463/1; 463/29; 463/30; 463/42

(58) Field of Classification Search ............. 463/1, 2, 463/5, 29–34, 40–42; 342/357.2, 358
See application file for complete search history.

(56) References Cited

U.S. PATENT DOCUMENTS

| | | | |
|---|---|---|---|
| 6,042,490 A * | 3/2000 | Lenhart | 473/415 |
| 6,266,614 B1 * | 7/2001 | Alumbaugh | 701/211 |
| 6,288,704 B1 * | 9/2001 | Flack et al. | 345/158 |
| 6,320,495 B1 * | 11/2001 | Sporgis | 340/323 R |
| 6,524,189 B1 * | 2/2003 | Rautila | 463/40 |
| 6,530,841 B2 * | 3/2003 | Bull et al. | 463/42 |
| 6,561,809 B1 * | 5/2003 | Lynch et al. | 434/16 |
| 6,863,610 B2 * | 3/2005 | Vancraeynest | 463/41 |
| 7,435,179 B1 * | 10/2008 | Ford | 463/42 |
| 2001/0029011 A1 * | 10/2001 | Dagani et al. | 434/11 |
| 2002/0006825 A1 * | 1/2002 | Suzuki | 463/40 |
| 2002/0090985 A1 * | 7/2002 | Tochner et al. | 463/1 |
| 2002/0111201 A1 * | 8/2002 | Lang | 463/2 |
| 2002/0167442 A1 * | 11/2002 | Taylor | 342/357.09 |
| 2003/0036428 A1 * | 2/2003 | Aasland | 463/29 |
| 2003/0144047 A1 * | 7/2003 | Sprogis | 463/9 |
| 2003/0190956 A1 * | 10/2003 | Vancraeynest | 463/40 |
| 2003/0224855 A1 * | 12/2003 | Cunningham | 463/41 |
| 2004/0058732 A1 * | 3/2004 | Piccionelli | 463/42 |
| 2004/0164897 A1 * | 8/2004 | Treadwell et al. | 342/358 |
| 2005/0049022 A1 * | 3/2005 | Mullen | 463/1 |

FOREIGN PATENT DOCUMENTS

| JP | 2002273034 A | * | 9/2002 |
|---|---|---|---|
| JP | 2002273035 A | * | 9/2002 |

\* cited by examiner

*Primary Examiner* — Melba Bumgarner
*Assistant Examiner* — Milap Shah

(57) ABSTRACT

A method of location-based gaming includes the steps of engaging a program to play a game, determining the location of a target object, providing the location of the target object to a central location, obtaining a data file pertaining to an object at the location of the target object, and generating gaming object data relative to the location of the target object.

17 Claims, 1 Drawing Sheet

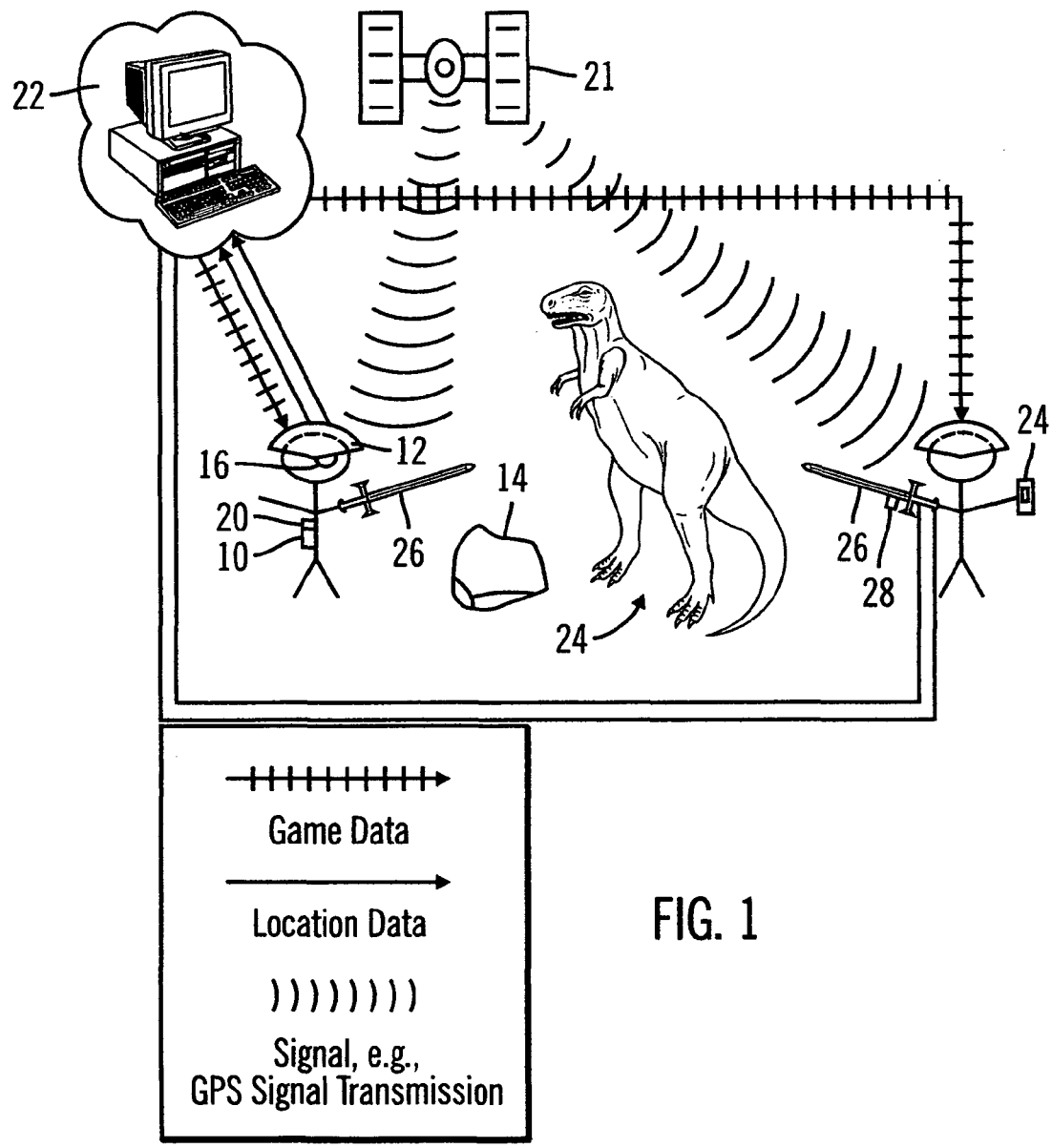
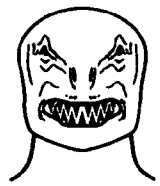
FIG. 2A
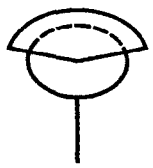
FIG. 2B
FIG. 1

METHOD, SYSTEM AND APPARATUS FOR LOCATION-BASED GAMING

This application is a continuation of U.S. patent application Ser. No. 10/461,171, filed Jun. 13, 2003, now abandoned which in turn was based on U.S. Provisional Patent Application Ser. No. 60/389,700, filed Jun. 14, 2002, the disclosures of each of which are incorporated in their entireties herein by reference.

FIELD OF THE INVENTION

The present invention relates to a method, system and apparatus for enabling a user to play a computer game or "video game" using information associated with a player or object at a specific location.

BACKGROUND OF THE INVENTION

Recent developments in telecommunications and data processing, and in particular the development of broadband capability in connection with wide-area networks such as the Internet and wireless interfaces to such networks, offer the potential for facilitating the transmission and reception of large amounts of information which may be directed to effectuating an electronic gaming environment in which one or more players may interact with each other and/or computer generated objects. However, at present it is typically necessary for a player to obtain the desired information and play electronic games at a single fixed location, such as a home or office computer, an Internet cafe or the like.

A need exists for a method for enabling players to interact with each other or objects in a game, or other persons in relation to the locations of the players, objects and/or other persons.

A need also exists for a system and apparatus for facilitating such methods.

SUMMARY OF THE PREFERRED EMBODIMENTS

In accordance with one aspect of the present invention, there is provided a method of location-based gaming that includes the steps of engaging a program to play a game, determining the location of a target object, providing the location of the target object to a central location, obtaining a data file pertaining to an object at the location of the target object, and generating gaming object data relative to the location of the target object.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which FIG. 1 is a schematic illustrating an example of a method of the invention by which a player identifies, locates, obtains information pertaining to and interacts with a game object and another player, which also illustrates the flow of data between various components employed in the method, and FIGS. 2a-b are illustrations of views generated for players 1 and 2 of FIG. 1, respectively.

DETAILED DESCRIPTION OF THE PREFERRED EMBODIMENTS

Turning now to the embodiment illustrated in FIG. 1, a player first engages a program to play a game. The game may be downloaded to the player's mobile computing device 10, such as a personal digital assistant, laptop computer or similar device. In some preferred embodiments, the player's mobile computing device may be connected to a heads-up display 12 for the purposes of displaying the game action, objects in the game, other players, scores, remote sensing features and the like.

In some preferred embodiments, the user determines the location of a target object 14, such as another player. In particular, the user determines the location of the target object relative to the user's location. The target object may be another player, a physical object such as a tree, a water source or rock, or merely a selected location in physical space which may be used to correspond to a virtual location in the game. The distance between the user and a target object is determined using a ranging device 16. Appropriate ranging devices include, without limitation, a device having an element that determines the distance or range to a target based on the eye positions of the user (e.g., using a cross-hairs element in the heads-up display); an infrared pointer device; an ultrasonic device; or any other ranging device.

Preferably, the player's mobile computing device 10 also carries a locating element, such as a GPS (Global Positioning System) locator 20 in communication with Global Positioning System 21, that provides the user's location, as well as the orientation of the user (i.e., the direction in which the user is facing). The user's location and orientation, together with the location of the target object relative to the user, thus can be used to determine the location of the target object.

Once the location of the target object has been determined, this location is transmitted to a central location 22, in particular to a central computer. In particular embodiments, the information is transmitted via a wide-area network, such as the Internet, using a device 24 carried by the user, such as, but not limited to, a personal data manager, a cellular telephone having Internet accessibility, etc.

When the central location is provided with the location of the target object, the central location searches for one or more data files pertaining to an object at that location. Such data files can include, without limitation, text files, photographic files, video files, audio files, or dynamically changing data associated with the target object. In some preferred embodiments, such as when the target object is one or more other players, the data regarding the location(s) of the other player(s) may be updated dynamically with new information regarding the present location of the other player(s) in physical space being supplied by one or more devices, such as GPS location devices 20.

In one preferred embodiment, two players are each equipped with wireless computers capable of detecting their physical locations and transmitting the locations via a wide area network to a gaming computer at central location 22, which coordinates the location of the players with each other and virtual objects generated by the gaming program. The program then generates game object (i.e., virtual object) 24 data, including perspective, size, etc., to the players so that the objects appearing in the heads-up displays 12 of the players appear to realistically change their appearance in relation to the location of the players. For example, if the players are fifty feet apart and across from each other in a large grassy meadow of a park, in some embodiments, the gaming computer would transmit data corresponding to a game object of a dinosaur presented in the heads-up display of the players in proper proportion to appear to be between the players. As the players move, for example, circling the area corresponding to the computer-generated location of the dinosaur game object, the players would receive in their displays a rapidly updated depiction of the game object corresponding to the views one would see if one were traversing around a real object. See FIGS. 2a-b.

In some embodiments, a physical game tool or utensil 26 is also equipped with a location sensing and transmitting means 28. In some embodiments the game tool is a sword which contains GPS location sensing and transmission capability. By the use of such additional devices which can report their location coordinates to the game computer, players may use such utensils in the game. For example, a player might appear to strike the aforesaid virtual dinosaur with the player's sword utensil.

In some particular embodiments, the locations of the players and their actions are incorporated into the game, interact in real time with virtual game objects, such as computer generated dinosaurs, and such interactions and other game objects are displayed in a semitransparent heads-up display 12 which enables the real world to be the backdrop for the game.

In other particular embodiments, the player could play against one or more physical players viewed directly via such semi-transparent heads-up displays, but who appear to be mixed into or otherwise superimposed upon the computer-generated game environments which are transmitted to the players' computers for display via their heads-up displays. The wireless computers may be capable of receiving voice commands via microphones attached to the heads-up displays. In one embodiment, the players could request to play a game in which voice commands are used exclusively.

Gaming object data as described above include video data, such as perspectives, sizes and the like. Further embodiments of the inventive method include additional gaming object data such as audio, tactile and olfactory information. In specific embodiments, one or more scent reservoirs, which are carried, for example, in a headset or other apparatus worn by a player, can be triggered in response to gaming object data generated by the gaming program.

What is claimed is:

1. A method of displaying game information on an electronic display device of a user's computer, the method comprising:
   determining the user computer's geographic location with a Global Positioning System (GPS) locator device;
   determining a distance between the user computer's geographic location and a target with a ranging device, wherein the ranging device is external to the GPS locator device and in communication with the user's computer;
   determining a geographic location of the target based in part on the user computer's geographic location and in part on the distance between the user computer's geographic location and the target;
   receiving, on the user's computer, data for a computer generated display for depicting a game object at the target location;
   receiving rapidly updated data for the displayed depiction of the game object corresponding to different views of the game object at the target location as the user's computer physically moves around the determined target location; and
   displaying rapidly updated data depicting the game object on the electronic display device of the user's computer, wherein the game object is depicted in a virtual space at a location corresponding to the determined geographic location of the target in a physical space.

2. The method of claim 1, wherein determining the geographic location of the target further comprises determining an orientation direction from the user computer's geographic location to the target.

3. The method of claim 1, wherein the target comprises a physical object in the physical space.

4. The method of claim 1, wherein the target is a selected location in the physical space.

5. The method of claim 1, wherein the target is selected by the user.

6. The method of claim 1, wherein providing the user's computer with data for a computer generated display comprises searching for data files pertaining to the game object at the location of the target.

7. The method of claim 1, further comprising:
   receiving by a second user's computer data for the computer generated display for depicting the game object at the target location;
   wherein the target location is in the physical space between the user computer's geographic location and a geographic location of the second user's computer.

8. The method of claim 1, further comprising transmitting the geographic location of the target to a central computer over a communication network, and wherein receiving rapidly updated data comprises receiving rapidly updated data from the central computer over the communication network.

9. A method for providing electronic display data for displaying game information on an electronic display device of a user's computer, the method comprising:
   determining a geographic location of a target based in part on a geographic location of the user's computer determined by a Global Positioning System (GPS) locator device and in part on a distance from the user computer's geographic location to the target determined by a ranging device, wherein the ranging device is external to the GPS locator device and in communication with the user's computer;
   searching with a central computer for data pertaining to a game object at the location of the target;
   providing the user's computer said data from the central computer, over a communication network, the data for depicting the game object at the target location on the electronic display of the user's computer; and
   providing from the central computer, over the communication network, rapidly updated data for the displayed depiction of the game object corresponding to different views of the game object at the target location as the user's computer physically moves around the determined target location, wherein the game object is depicted in a virtual space at a location corresponding to the determined geographic location of the target in a physical space.

10. The method of claim 9, wherein determining the geographic location of the target comprises determining a distance between the user computer's geographic location and the target.

11. The method of claim 10, wherein determining the geographic location of the target further comprises determining an orientation direction from the user computer's geographic location to the target.

12. The method of claim 9, further comprising:
providing a second user's computer data for the computer generated display for depicting the game object at the target location on a computer display of the second user's computer;
wherein the target location is in the physical space between the user computer's geographic location and a geographic location of the second user's computer.

13. The method of claim 9, wherein determining a geographic location of a target comprises receiving the geographic location of the target at the central computer over the communication network, and wherein providing rapidly updated data comprises providing rapidly updated data from the central computer over the communication network.

14. A system for displaying game information on an electronic display device of a user's computer, the system comprising a central computer connected for communication with the user's computer over a wireless computer network, the central computer configured to:
determine a geographic location of a target based in part on the user's computer geographic location determined by a Global Positioning System (GPS) locator device and in part on a distance from the user computer's geographic location to the target determined by a ranging device, wherein the ranging device is external to the GPS locator device and in communication with the user's computer;
search for data pertaining to a game object at the location of the target;
provide the user's computer with the data for a computer generated display depicting the game object at the target location on the electronic display of the user's computer; and
rapidly update the data at the user's computer for the displayed depiction of the game object corresponding to different views of the game object at the target location as the user's computer physically moves around the determined target location, wherein the game object is depicted in a virtual space at a location corresponding to the determined geographic location of the target in a physical space.

15. The system of claim 14, wherein to determine the geographic location of the target, the central computer is configured to obtain data corresponding to a distance between the geographic location of the user's computer and the target.

16. The system of claim 15, wherein to determine the geographic location of the target, the central computer is further configured to obtain data corresponding to an orientation direction from the geographic location of the user's computer to the target.

17. The system of claim 14, wherein to determine a geographic location of a target, the central computer is configured to receive the geographic location of the target over the wireless computer network, and wherein to provide rapidly updated data, the central computer is configured to transmit rapidly updated data over the wireless computer network.

* * * * *